United States Patent
Hawkins et al.

(10) Patent No.: US 7,815,146 B2
(45) Date of Patent: Oct. 19, 2010

(54) COMBUSTIBLE OUTGASSING MATERIAL LINED ALTITUDE COMPENSATING ROCKET NOZZLE

(75) Inventors: Gary F. Hawkins, Torrance, CA (US); John W. Murdock, Palos Verdes Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 2856 days.

(21) Appl. No.: 09/942,238

(22) Filed: Aug. 29, 2001

(65) Prior Publication Data

US 2009/0133405 A1    May 28, 2009

(51) Int. Cl.
*B64F 1/04* (2006.01)
*F02K 9/00* (2006.01)

(52) U.S. Cl. .................. 244/63; 244/171.1; 244/172.2; 60/242; 60/233; 60/255; 60/251

(58) Field of Classification Search ............. 60/242, 60/233, 250, 251, 255; 244/172, 63, 127.2, 244/171.1
See application file for complete search history.

(56) References Cited

U.S. PATENT DOCUMENTS

| | | | | |
|---|---|---|---|---|
| 4,821,510 A | * | 4/1989 | Graser et al. | 60/242 |
| 5,579,635 A | * | 12/1996 | Miskelly et al. | 102/374 |
| 6,220,852 B1 | * | 4/2001 | Moore | 239/265.19 |
| 6,233,919 B1 | * | 5/2001 | Abel et al. | 239/265.19 |

* cited by examiner

*Primary Examiner*—J. Woodrow Eldred

(57) ABSTRACT

A fixed sized bell rocket nozzle is lined with a layer of combustible material that is ignited during launch ignition and burns to outgas into the rocket exhaust for spatially variably confining the exhaust and perfecting an effective variably sized altitude compensating exhaust nozzle that maximizes lift during the launch of a spacecraft into orbit.

10 Claims, 3 Drawing Sheets

ALTITUDE COMPENSATING NOZZLE

ALTITUDE COMPENSATING NOZZLE

UNIGNITED COMBUSTIBLE
MATERIAL

IGNITED COMBUSTIBLE
MATERIAL

BURNING COMBUSTIBLE
MATERIAL

BURNED COMBUSTIBLE
MATERIAL

COMBUSTIBLE OUTGASSING MATERIAL LINED ALTITUDE COMPENSATING ROCKET NOZZLE

FIELD OF THE INVENTION

The invention relates to the field of rocket engines and bell nozzles. More particularly, the present invention relates to a bell rocket nozzle for maximizing lift capability during launch of a spacecraft.

BACKGROUND OF THE INVENTION

A rocket propulsion system is used to lift and propel spacecraft with a payload into space. The rocket propulsion system includes a rocket engine powered by rocket engine propellant to produce a gaseous exhaust providing necessary thrust to lift the spacecraft into orbit. A rocket engine includes a rocket motor, a combustion chamber and an exhaust nozzle. Rocket engine propellant is burned in the combustion chamber to produce the exhaust that may exit through the nozzle. The rocket propulsion system produces thrust by generating pressures in the combustion chamber and nozzle. The exhaust thrust pushes and hence lifts the launch vehicle off the surface of the earth into orbit.

One type of rocket engine nozzle is the bell shaped rocket nozzle having a bell shaped exit cone. The bell shaped exit cone may be configured to a predetermined size with a predetermined expansion ratio. That is, the ratio of the diameter of the nozzle at the entrance of the nozzle at the combustion chamber to the diameter of the nozzle at the aft end where the exhaust gases exit the nozzle. For a launch off the ground, extremely high expansion ratio nozzles are not employed because the exhaust separates from the nozzle wall causing large side forces during launch. When the nozzle size is over expanded with a high expansion ratio, then the nozzle exit pressure may be less than the local atmospheric pressure and a resulting portion of the nozzle is producing negative thrust as a drag effect. On the other hand, when the nozzle is under expanded with a low expansion ratio, then the nozzle exit pressure is greater than the local atmospheric pressure and the nozzle may not be producing as much thrust as would a larger highly expanded nozzle. Optimum thrust production occurs when the nozzle is perfectly variably expanded so that the exit pressure just matches the atmospheric pressure that changes with altitude during the launch phase.

Consequently, as a launch vehicle increases in altitude during the launch phase, the optimal outlet pressure of the nozzle exhaust should change as the atmospheric pressure decreases. None of the currently used rocket boosters change the outlet pressure of the respective nozzles during the launch phase. Typically, boosters use a fixed sized nozzle with an outlet pressure that is selected to optimize the average performance during the launch phase. These booster nozzles typically over expand the exhaust gases at liftoff and under expand the exhaust gases at high altitudes. One type of rocket engine is the Aerospike engine that is the only current rocket engine in development that uses a variably sized nozzle for maximizing lift thrust during the entire launch phase through launch altitude levels. Rocket engines lift performance is optimized by variably sized nozzles through mechanical enhancements. Continuously optimizing the exit pressure of a nozzle has the potential to greatly increase the performance of the rocket engine.

Referring to FIG. 1, the potential increase in lifting capability for a typical booster is maximized when the expansion ratio is matched to the upper dashed curve ending with an expansion ratio of $\epsilon=5200:1$. The upper dashed performance line ending with the ratio $\epsilon=5200:1$ is the specific impulse of the engine when the nozzle is optimized at all altitudes. The lower solid performance line shows the specific impulse with a fixed $\epsilon=8:1$ expansion ratio of the nozzle with engine performance matched to low altitudes with a lower performance at higher altitudes. The middle dashed performance line shows the specific impulse when the nozzle is fixed to a $\epsilon=32:1$ expansion ratio. The $\epsilon=32:1$ expansion ratio yields a lower performance at low altitudes because nozzle is over expanded but has a higher performance at higher altitudes. Hence, it is desirable to vary the expansion ratio of a nozzle by varying the nozzle exit diameter during the launch phase. The nozzle exit diameter could be expanded by a factor of two during the launch phase for increasing the expansion ratio by a factor of four, for example, from $\epsilon=8:1$ to $\epsilon=32:1$. The optimum specific impulse would be given by the optimized dashed line up to 40K feet. After reaching an altitude of 40K feet, the value of the specific impulse would follow the $\epsilon=32:1$ performance line for the remainder of the launch phase flight. Even this limited variability would increase the specific impulse from 309 seconds to 337 seconds.

The specific impulse function of a rocket engine has an effect on a payload lift capability of a rocket. The payload delivered to orbit is a function of the average specific impulse of the engine. The launch path during the launch phase can be calculated using the orbital parameters. Large payload capability gains can occur from increases in the specific impulse of the rocket engine. This potential payload lift capability gain can be realized using techniques for continuously optimizing the nozzle exit pressure of the rocket engine.

The advantages of continuously optimizing the outlet pressure of a rocket nozzle during the launch phase flight have been known for fifty years over which time many mechanical designs have been proposed. Unfortunately, all of those mechanical designs have been considered too costly, too heavy, or too complicated to be incorporated in a practical launch vehicle. Large heavy complicated mechanical systems that variably adjust the exit diameter of the nozzle will suffer from increased costs and reduced reliability of the rocket propulsion system. These and other disadvantages are solved or reduced using the invention.

SUMMARY OF THE INVENTION

An object of the invention is to provide a rocket nozzle having an effective variably sized exit diameter.

Another object of the invention is to provide a rocket nozzle having an effective variably sized exit diameter for variably changing an expansion ratio of the nozzle during a launch of a launch vehicle.

Yet another object of the invention is to provide a rocket propulsion system having a rocket nozzle with an effective variably sized exit diameter for variably changing the expansion ratio of the nozzle during a launch phase of a launch vehicle so as to optimize the lift capability of the rocket propulsion system.

The present invention is directed to a relatively thin layer of combustible material disposed on the interior of the downstream aft portion of a rocket nozzle. The combustible material is an interior lining in the rocket nozzle that adjusts the exhaust pressure during the launch phase so as to match the exhaust pressure of the nozzle to atmospheric pressure over a large range of altitudes for increasing the lift carrying performance of a rocket engine without additional mechanical parts. The combustible material can be retrofitted into existing rocket nozzles. The combustible material is relatively inexpensive and carries no additional weight to high altitudes. In the preferred form, the combustible material is thinnest at a leading edge at a forward end and is thickest at the aft end of the nozzle. That is, the material preferably linearly tapers from a zero thickness at the forward end to be thickest at the aft end of nozzle. The leading edge of the material is located at the point along the vertical height dimension of the nozzle where the expansion ratio of the nozzle optimizes the engine thrust performance at the altitude of the launch site. The material thickness, position and taper are selected to optimize the lift carrying capability of the rocket propulsion system. In some applications, the taper may be nonlinear in thickness for particular rocket nozzles.

The combustible material is ignited by the exhaust of the rocket engine when the engine starts combustion of the main rocket engine propellant. After ignition of the rocket engine and the combustible material, and as the engine exhaust gases travel down the nozzle, the exhaust gases are diverted away and separated from the interior surface of the nozzle where the exhaust gases meet outgassing gases generated by the combustible burning liner material. The diversion of the exhaust gases occurs near the leading edge of the ignited combustible material. The location of the leading edge of the combustible material and the tapered thickness is selected to optimize the nozzle expansion ratio for the corresponding altitude levels through which the launch vehicle passes during the launch phase. Consequently, the exhaust gases proceed down the remainder of the nozzle without expanding further until exhaust gases are released and exhausted into the atmosphere. The outgassing gases generated by the combustible material create an orthogonal outgassing pressure plane inside the nozzle approximately equal to the external atmospheric pressure as the external atmospheric pressure change along the altitude levels passed by the launch vehicle during the launch phase.

As the combustible liner material is burned, the leading edge of the combustible material recedes down the nozzle at a prescribed rate due to a predetermined thickness variation of the combustible liner material. Concomitantly, the effective nozzle expansion ratio continually increases as the leading edge of the burning combustible material recedes aft during the launch phase as the vehicle passing through higher altitudes. The recession rate during burning of the combustible liner material is chosen so that the nozzle expansion ratio is optimized continuously during the launch phase. Finally, at high altitudes, when optimization is no longer beneficial, the combustible liner material has then completely burned out. A traditional large expansion ratio nozzle then remains to finish the space mission. In this manner, a conventional bell rocket motor nozzle can be adapted to provide a variable nozzle expansion ratio that optimizes the performance lift capabilities of the rocket propulsion system. These and other advantages will become more apparent from the following detailed description of the preferred embodiment.

DETAILED DESCRIPTION OF THE PREFERRED EMBODIMENT

An embodiment of the invention is described with reference to the figures using reference designations as shown in the figures.

Figure 2:
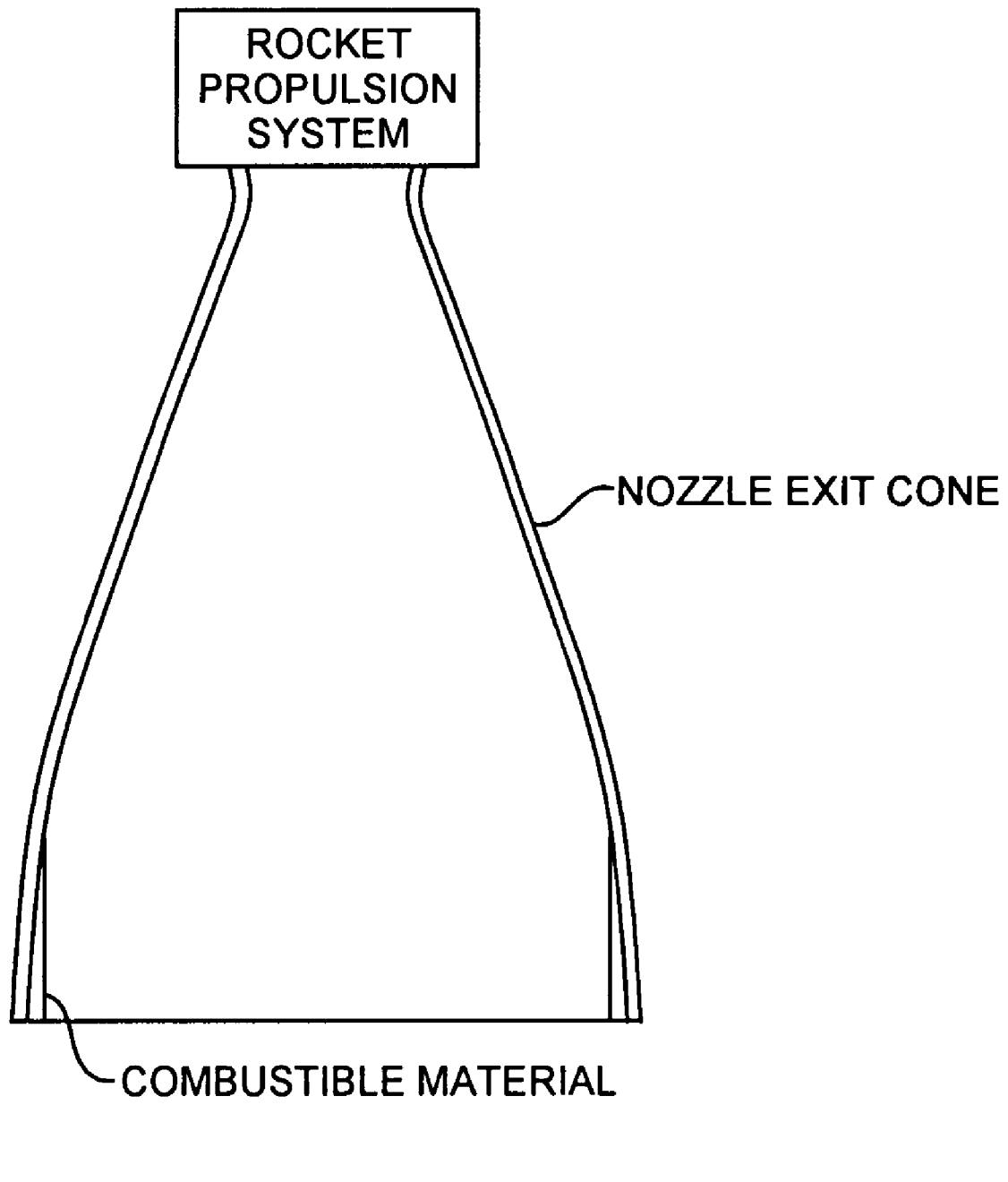
FIG. 2 is a diagram of an altitude compensating nozzle.
Figure 3A:
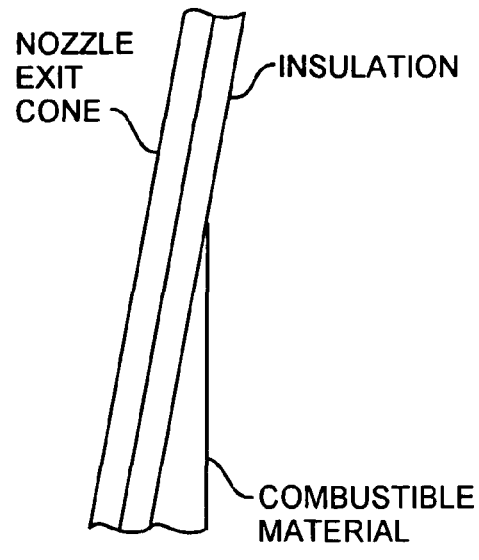
FIGS. 3A, 3B, 3C and 3D are diagrams of the burn states of combustible material lining the altitude compensating nozzle.
Figure 3B:
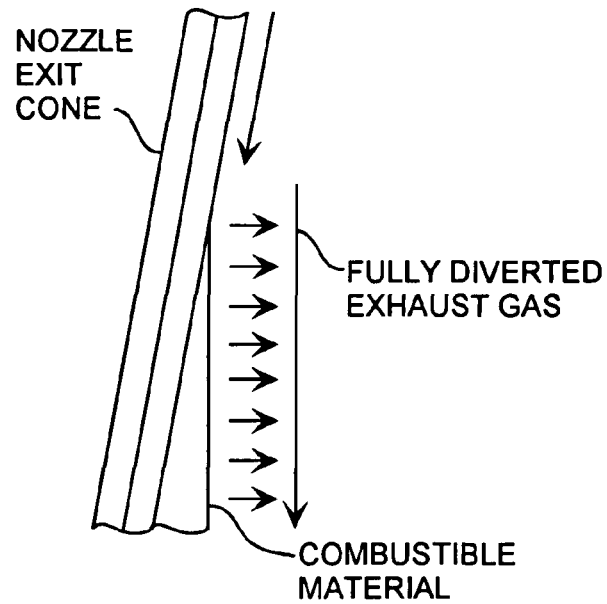
Figure 3C:
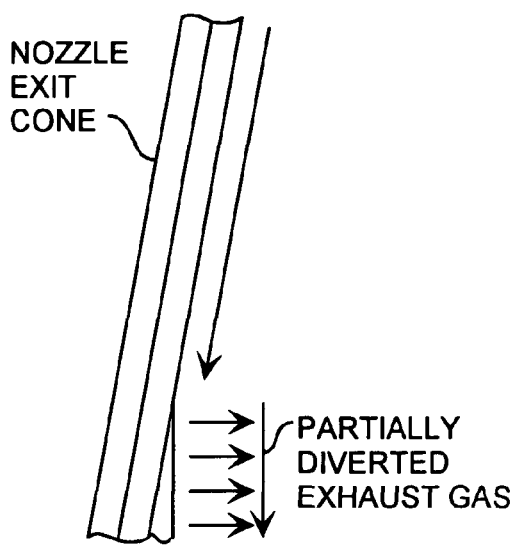
Figure 3D:
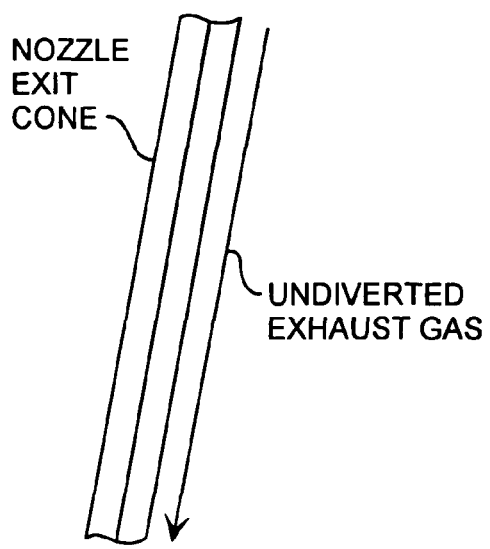

Referring to FIG. 2, a nozzle exit cone is part of rocket propulsion system including rocket propellant, not shown, and a rocket engine that includes a rocket motor, not shown, a combustion chamber, not shown, and an exhaust nozzle shown as the nozzle exit cone. The nozzle exit cone is simply referred to as the nozzle that is shown configured as a bell shaped rocket nozzle. Combustible material lines the interior cone surface of the nozzle preferably at the aft end of the exit cone as an altitude compensating nozzle. The combustible material can be adapted to be retrofitted into existing bell rocket nozzles. The combustible material is preferably a conventional solid rocket propellant, but may be any combustible material that provides an outgassing pressure when burned.

Referring to FIGS. 3A, 3B, 3C and 3D, the nozzle exit cone may have an existing insulation layer on which is disposed the combustible material that is preferably tapered with increasing thickness from a forward end towards an aft end. When a rocket motor is ignited, exhaust from the combustion chamber exits through the nozzle and ignites the combustible material that fully diverts the exhaust gas away from combustible material. The axial tapering of the combustible material circumferentially lines the interior of the nozzle so that the outgassing pressure surrounds and confines the engine exhaust. Once ignited, the combustible material generates hot gases that divert the engine exhaust flow. The diversion first occurs at the leading edge of the combustible material. The combustible material burns evenly over the surface of the combustible material so that the leading edge of the remaining combustible material moves down the cone. During the burning of the combustible material, the exhaust gas is firstly fully diverted just after ignition, then partially diverted during burning, and then undiverted when all of the combustible material has been burned. The diverting outgassing gas emanating from the combustible material diverts the flow of the exhaust gases and maintains the pressure in the interior of the nozzle to that of the local atmosphere. The burning of the combustible material causes the leading edge to recede down the nozzle allowing the exhaust gases to expand further during the launch phase. The rate of recession of the leading edge is controlled by the thickness and combustion properties of the combustible material. The recession rate is chosen to be such that the expansion of the exhaust gases is optimized at all times. At high altitudes, late in the launch phase, where restricting the exhaust gas expansion is no longer needed, the combustible material has completely burned away and no additional weight is carried higher into orbit.

Figure 1:
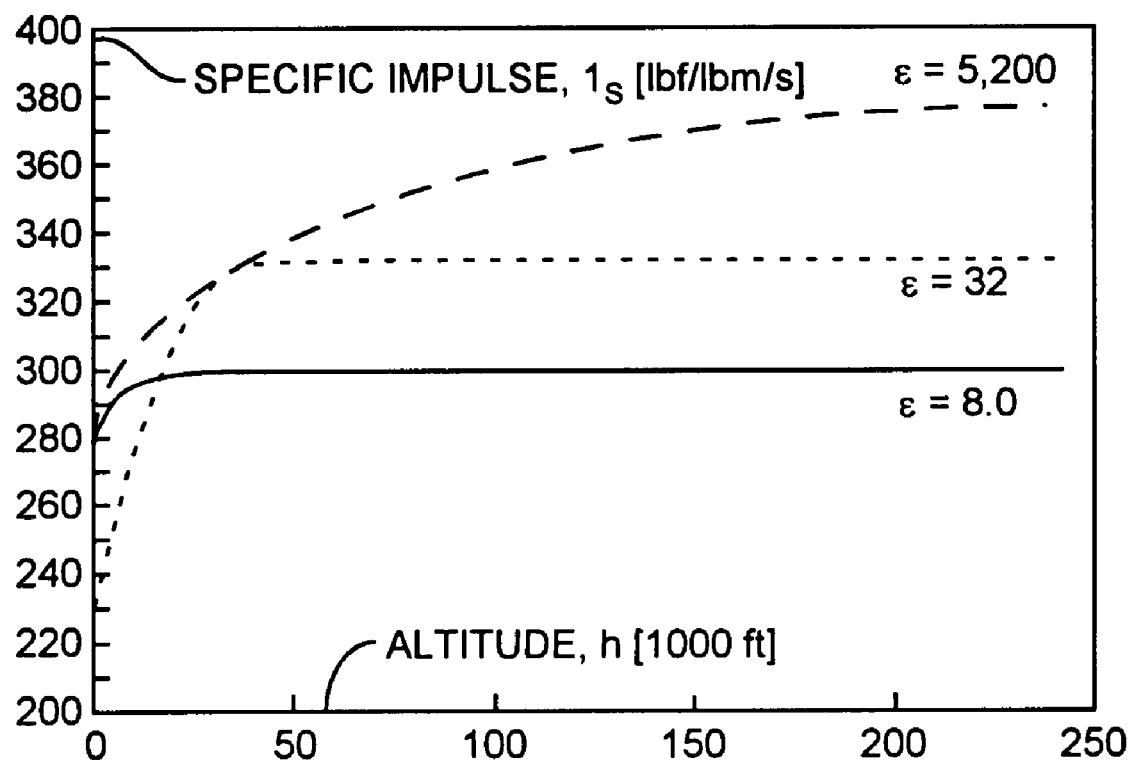
FIG. 1 is a graph of a variable specific impulse as a function of altitude.

Referring to all of the Figures, and more particularly to FIG. 1, the optimal expansion ratio is not a strong function of altitude so the leading edge location can be somewhat off nominal without a significant loss of performance. The combustible material serves to adjust the expansion ratio over flight altitudes, for example, starting with an expansion ratio of $\epsilon=8:1$ for lower altitude and increasing to $\epsilon=32:1$ at higher altitudes, for maximizing the lift capability. The leading edge of the combustible material is located where the expansion ratio of the nozzle is optimized for both lower and higher altitudes. Downstream of the leading edge the combustible material functions to maintain the nozzle internal pressure such that the separated exhaust gases neither reattaches to the interior of the exit cone nor compresses beyond an optimal pressure. The optimal separation is accomplished by controlling the burning rate of the combustible material as well as the burning surface geometry. The combustible material should supply gas to the nozzle at approximately the same rate as the exhaust gases aspirate out.

By way of example, the combustible material may cover the aft 40.0 inches of the interior of the nozzle. The material is thickest at the aft end, for example, 2.1 inches thick, and linearly tapers to zero at the forward end at the leading edge. The required rate of outgassing generated by the combustible material has been approximated for the Titan motor and is 95 lb/s at liftoff. The surface area of the combustible material at liftoff is 112.0 ft$^2$, that is 3.4 feet axial by 33.0 feet in circumference. At one atmosphere, a typical solid propellant produces 0.75 lb/ft$^2$. This results in 84.0 lb/sec of gas generated and is close to the optimum 95 lb/sec. Consequently, a material similar to traditional solid rocket propellant fulfils the gas generating requirements.

The maximum thickness of the combustible material at the aft end of the nozzle can be calculated from a burn rate of 0.08 inches/sec at liftoff and 0.06 inches/sec at higher altitudes. With the material required for the first 30.0 seconds of flight, until an altitude of 50K feet, the maximum thickness of the material should be 2.1 inches. With this combustible material employed in an existing Titan nozzle, the rocket motor would develop 12,400 additional pounds of thrust. The added material would weigh 2,000 lbs and would burn out in about 35 seconds. When a Delta IV RS68 engine is retrofitted with the combustible material, the rocket engine would gain in thrust. When the space shuttle main engines are lined with the combustible material, the rocket engines would also gain in thrust. A large gain in the space shuttle main engines stems from the fact that the space shuttle main engines are engines designed to work in the vacuum of space. Consequently, the space shuttle main engines greatly over expand the exhaust gases during liftoff to give the engines more thrust in space. The use of the combustible material adds lift thrust at lower altitudes.

One use of the combustible material is lining a very large expansion ratio nozzle of an existing rocket engine. The combustible material may be retrofitted to allow large expansion nozzles to have increase lift at lower altitudes. The selection of the combustible material, interior placement and tapered thickness can be selected to match a particularly shaped exit cone. Those skilled in the art can make enhancements, improvements, and modifications to the invention, and these enhancements, improvements, and modifications may nonetheless fall within the spirit and scope of the following claims.

What is claimed is:

1. A nozzle of a rocket propulsion system for propelling a vehicle during a launch phase, the nozzle comprising,
   a cone for exhausting exhaust from the rocket propulsion system, and
   combustible material disposed on an interior surface of the cone, the exhaust igniting the combustible material outgassing diversion gases creating an outgassing diversion pressure upon the exhaust for diverting the exhaust gases away from the interior surface during the launch phase.

2. The nozzle of claim 1 wherein,
   the combustible material is a solid rocket propellant.

3. The nozzle of claim 1 wherein,
   the cone is bell shaped.

4. The nozzle of claim 1 wherein,
   the combustible material circumferentially lines the interior surface of an aft end of the cone.

5. The nozzle of claim 1 wherein,
   the combustible material is tapered in thickness from a zero thickness at a forward end to a final thickness at an aft end.

6. The nozzle of claim 1 wherein,
   the combustible material is tapered in thickness from a zero thickness at a forward end to a final thickness at an aft end, and
   the forward end has a leading edge moving down the interior of the cone during burning of the combustible material during the launch phase decreasing the outgassing diversion pressure.

7. The nozzle of claim 1 wherein,
   the combustible material is tapered in thickness from a zero thickness at a forward end to a final thickness at an aft end,
   the forward end has a leading edge moving down the interior of the cone during burning of the combustible material during the launch phase for decreasing the outgassing diversion pressure during the launch phase, and
   the decreasing of the outgassing diversion pressure tending to increase an effective expansion ratio of the cone.

8. The nozzle of claim 1 wherein,
   the combustible material is tapered in thickness from a zero thickness at a forward end to a final thickness at an aft end,
   the forward end having a leading edge moving down the interior of the cone during burning of the combustible material during the launch phase for decreasing the outgassing diversion pressure during the launch phase, and
   the decreasing outgassing diversion pressure tending to increase an effective expansion ratio of the cone during the launch phase for increasing an effective lift capability of the rocket propulsion system.

9. A bell nozzle of rocket propulsion system for propelling a vehicle during a launch phase, the nozzle comprising,
   a bell shaped cone for exhausting exhaust from the rocket propulsion system, and
   a combustible material circumferentially lining an aft end interior surface of the bell shaped cone, the combustible material disposed on an interior surface of the bell shaped cone, the combustible material being tapered in thickness from a zero thickness at a forward end to a final thickness at the aft end, the exhaust igniting the solid rocket propellant for outgassing diversion gases for creating an outgassing diversion pressure upon the exhaust for diverting the exhaust gases during the launch phase, the forward end having a leading edge moving down the interior of the bell shaped cone during burning of the solid rocket propellant for decreasing the outgassing diversion pressure during the launch phase, the decreasing outgassing diversion pressure tending to increase an effective expansion ratio of the bell shaped cone during the launch phase.

10. A bell nozzle of rocket propulsion system for propelling a vehicle during a launch phase, the nozzle comprising,
    a bell shaped cone for exhausting exhaust from the propulsion system, and
    a solid rocket propellant circumferentially lining an aft end interior surface of the bell shaped cone, the solid rocket propellant being disposed on an interior surface of the bell shaped cone, the solid rocket propellant being tapered in thickness from a zero thickness at a forward end to a final thickness at the aft end, the exhaust igniting the solid rocket propellant for outgassing diversion gases for creating an outgassing diversion pressure upon the exhaust for diverting the exhaust gases during the launch phase, the forward end having a leading edge moving down the interior of the bell shaped cone during burning of the solid rocket propellant for decreasing the outgassing diversion pressure during the launch phase, the decreasing outgassing diversion pressure tending to increase an effective expansion ratio of the bell shaped cone during the launch phase for increasing an effective lift capability of the rocket propulsion system.

* * * * *